(12) United States Patent
Ah-Soon et al.

(10) Patent No.: US 9,275,121 B2
(45) Date of Patent: Mar. 1, 2016

(54) INTEROPERABLE SHARED QUERY BASED ON HETEROGENEOUS DATA SOURCES

(71) Applicants: Christian Ah-Soon, Colombes (FR); Olivier Tsoungui, Viry Chatillon (FR)

(72) Inventors: Christian Ah-Soon, Colombes (FR); Olivier Tsoungui, Viry Chatillon (FR)

(73) Assignee: SAP SE, Walldorf (DE)

( * ) Notice: Subject to any disclaimer, the term of this patent is extended or adjusted under 35 U.S.C. 154(b) by 136 days.

(21) Appl. No.: 13/733,531

(22) Filed: Jan. 3, 2013

(65) Prior Publication Data

US 2014/0188845 A1    Jul. 3, 2014

(51) Int. Cl.
*G06F 17/30*    (2006.01)

(52) U.S. Cl.
CPC .............................. *G06F 17/30566* (2013.01)

(58) Field of Classification Search
CPC .................... G06F 17/30864; G06F 17/30867; G06F 17/3087; G06F 17/30675; G06F 17/30696
USPC ........................................................ 707/722
See application file for complete search history.

(56) References Cited

U.S. PATENT DOCUMENTS

| 5,257,366 A | 10/1993 | Adair et al. |
| 5,278,978 A | 1/1994 | Demers et al. |
| 5,511,186 A | 4/1996 | Carhart et al. |
| 5,895,465 A | 4/1999 | Guha |
| 5,903,893 A | 5/1999 | Kleewein et al. |
| 5,913,214 A * | 6/1999 | Madnick et al. |
| 5,970,490 A | 10/1999 | Morgenstern |
| 5,995,961 A | 11/1999 | Levy et al. |
| 7,533,107 B2 | 5/2009 | Gupta et al. |
| 7,945,597 B2 | 5/2011 | Cras et al. |
| 8,645,228 B2 | 2/2014 | Moussa et al. |
| 8,688,683 B2 | 4/2014 | Simon et al. |
| 8,694,524 B1 * | 4/2014 | Pham et al. ................ 707/759 |
| 2001/0051956 A1 | 12/2001 | Bird |
| 2010/0070448 A1* | 3/2010 | Omoigui .................... 706/47 |
| 2010/0185678 A1* | 7/2010 | Dettinger et al. ........ 707/784 |
| 2010/0318583 A1* | 12/2010 | Cohen ........................ 707/805 |
| 2012/0084315 A1 | 4/2012 | Schneider et al. |
| 2012/0130942 A1* | 5/2012 | Dipper et al. ............. 707/602 |
| 2013/0124562 A1* | 5/2013 | Christensen et al. ..... 707/770 |
| 2014/0067836 A1 | 3/2014 | Holmes et al. |
| 2014/0143267 A1* | 5/2014 | Bice et al. ................. 707/763 |

FOREIGN PATENT DOCUMENTS

| CA | 2468617 C | 6/2010 |
| CN | 101615192 A | 12/2009 |

* cited by examiner

*Primary Examiner* — Cam-Y Truong
(74) *Attorney, Agent, or Firm* — Fish & Richardson P.C.

(57) ABSTRACT

The disclosure generally describes computer-implemented methods, software, and systems for creating and using shared queries based on heterogeneous data sources. One example method includes receiving a request to execute a shared query, identifying at least one data source and a query specification associated with the shared query, generating a native query for each identified data source based on the identified query specification, executing the generated native queries at the respective data sources to collect a set of query results from the respective data sources, and formatting the set of query results from the respective data sources into a unified set of query results.

17 Claims, 5 Drawing Sheets

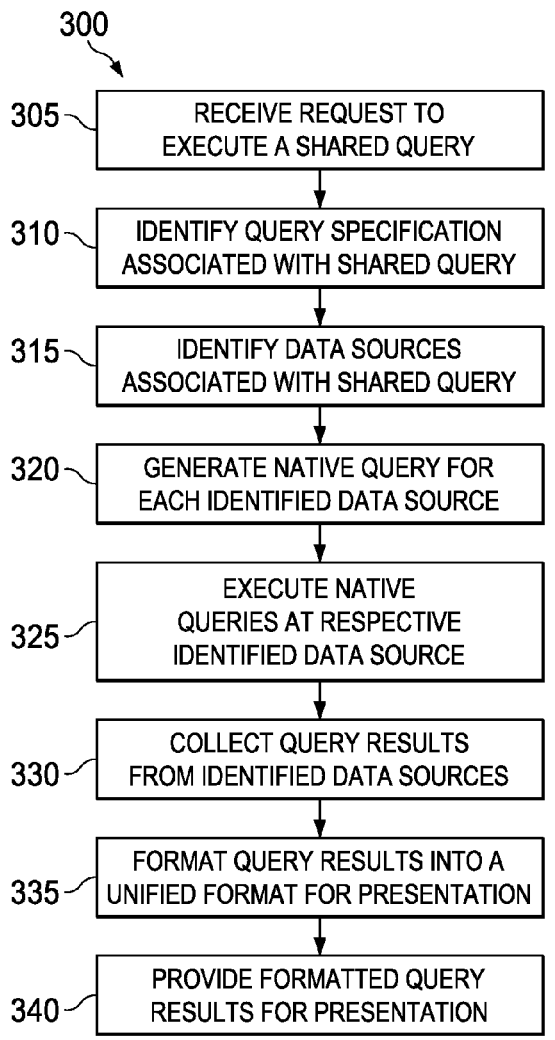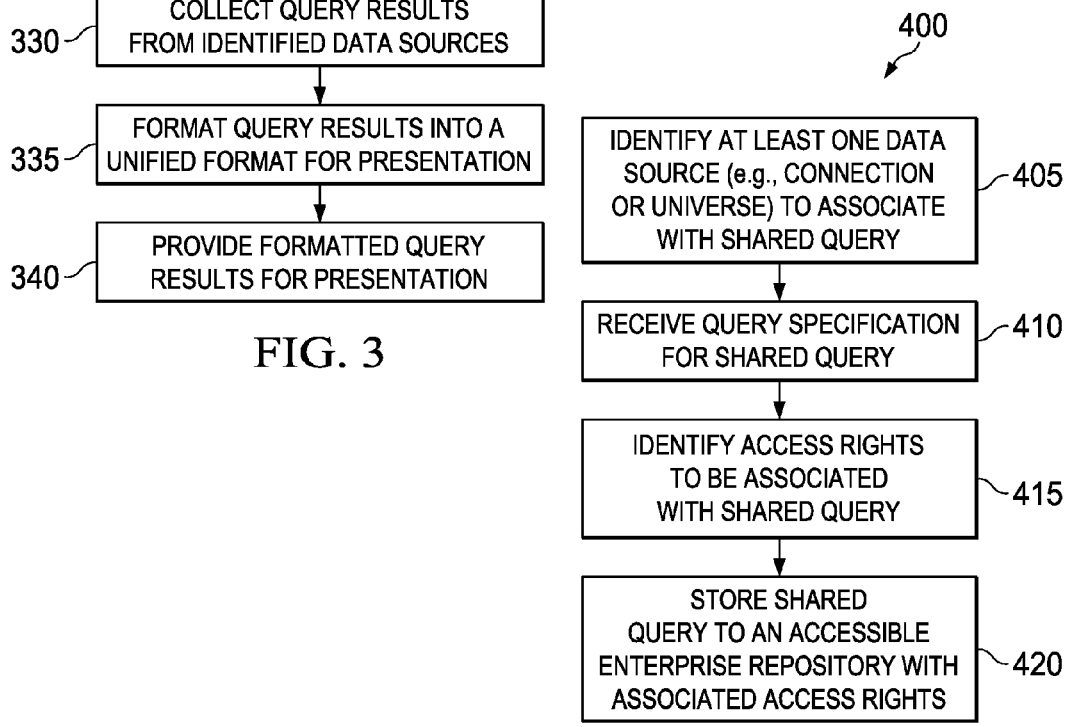

INTEROPERABLE SHARED QUERY BASED ON HETEROGENEOUS DATA SOURCES

BACKGROUND

The present disclosure relates to computer-implemented methods, non-transitory computer-readable media, and computer systems for creating and using shared queries based on heterogeneous data sources.

Various reporting tools allow users to query databases through various technologies supported by their respective middleware applications and services. Generally, each query may be performed upon a single database or data source. For example, business object universes, as well as universes that contain business objects (e.g., SAP's BusinessObjects Universes) have been created to hide relational database complexity (e.g., their specific tables and columns) and to allow users to search and to query universes based on particular business objects these universes contain or are otherwise associated. Queries specific to these universes can be defined to allow searching the databases based on known or desired business object criteria. Another example of data sources directly queried include particular files and data sources, including but not limited to text files, web services, Extensible Markup Language (XML), spreadsheet files, and other suitable sources. Specific fields or information from each of these sources may be extracted using known techniques, allowing for queries based on the extracted information to be used in search operations. Additionally, direct access methods can be used to query online analytical processing (OLAP) databases. In some instances, a new multidimensional universe may be created on the fly on top of metadata exposed by the OLAP database, with particular fields or other searchable categories to be provided and searched via standard query tools.

SUMMARY

The disclosure generally describes computer-implemented methods, software, and systems for creating and using shared queries based on heterogeneous data sources. One example method includes receiving a request to execute a shared query, identifying at least one data source and a query specification associated with the shared query, generating a native query for each identified data source based on the identified query specification, executing the generated native queries at the respective data sources to collect a set of query results from the respective data sources, and formatting the set of query results from the respective data sources into a unified set of query results.

The details of one or more implementations of the subject matter of the present disclosure are set forth in the accompanying drawings and the description below. Other features, objects, and advantages of the subject matter will be apparent from the description, the drawings, and the claims.

DESCRIPTION OF DRAWINGS

FIG. 3 is a flow chart illustrating an example method for executing a shared query.

FIG. 4 is a flow chart illustrating an example method for defining a shared query.

DETAILED DESCRIPTION

Figure 1:
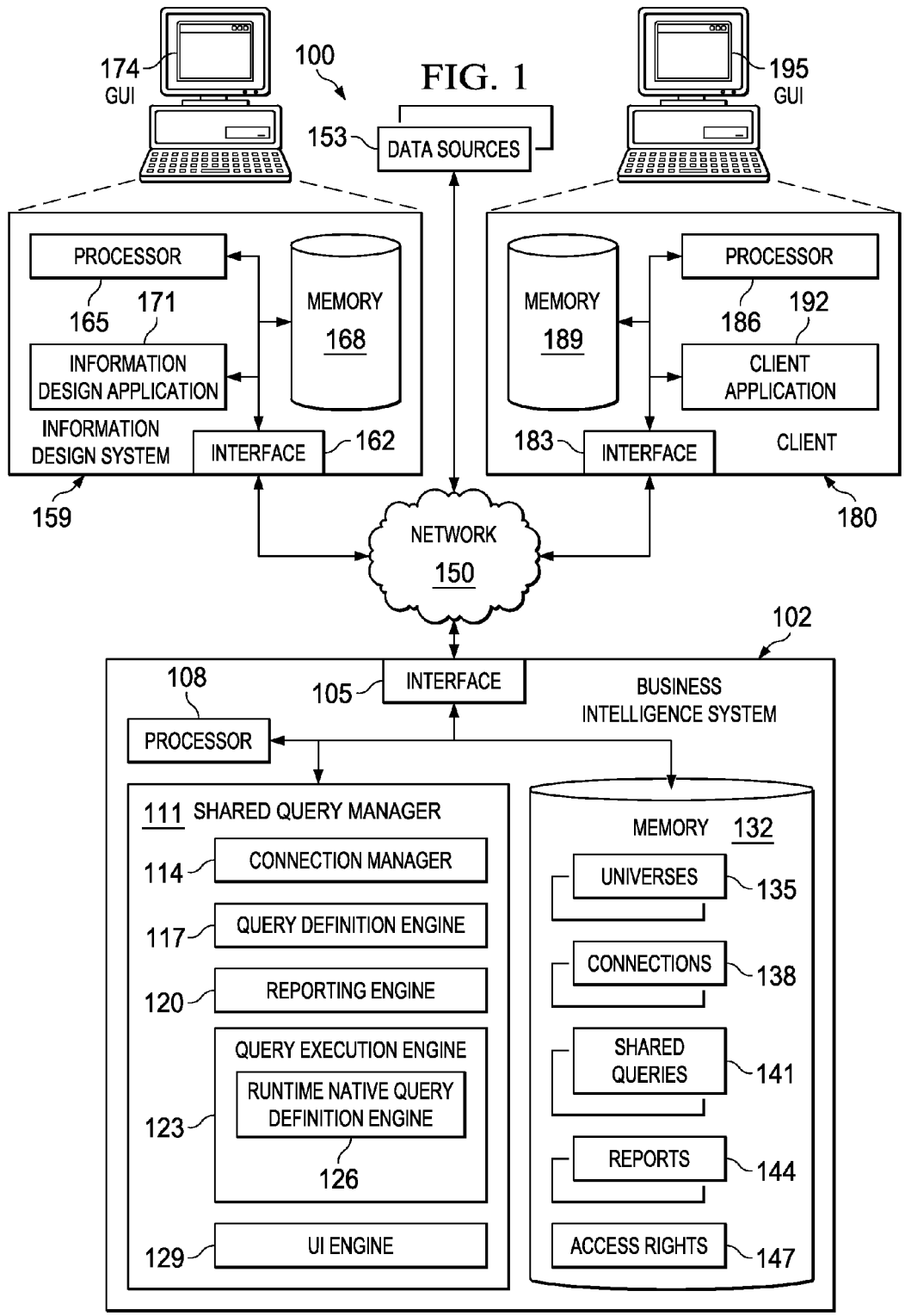
FIG. 1 is a block diagram illustrating an example distributed computing system for creating and using shared queries based on heterogeneous data sources.

The present disclosure relates to computer-implemented methods, non-transitory computer-readable media, and computer systems for creating and using shared queries based on heterogeneous data sources.

In particular, the present disclosure provides a semantic layer shared query solution, which allows queries to be created and shared to a central repository, where the shared queries are accessible by multiple users and require only a single creation of the shared query. In addition to reusable queries, the shared queries allow for multiple heterogeneous data sources to be included in the shared query, such that different data sources can be combined into a single query from the user's perspective. For example, previously defined business object universes, specifically-identified data sources, and OLAP databases, among others, can be combined in a shared multi-source query. Additionally, some universes may include or be associated with multiple data sources.

Generally, the shared queries can be created on top of one or more heterogeneous sources supported by the corresponding semantic layer. These heterogeneous sources may include, for example, relational or multidimensional universes, direct access to OLAP or similar databases, and specific data sources (e.g., text files, spreadsheets, web services, and other documents). In some instances, and depending on the semantic layer's functionality, additional data sources such as web sites, social networks, and other suitable sources may be included within a single shared query.

Shared queries also provide the flexibility to be used with a plurality of different tools. For example, requests to execute shared queries could be received from any suitable business intelligence application or tool (e.g., SAP's Visual Intelligence or Web Intelligence tools), reporting tools (e.g., Crystal Reports), and any other suitable tool for accessing and interacting with the shared queries.

The shared queries can be shared, or persisted, to a central enterprise repository, with the full set of information needed to run the query associated with the shared query. That information can include data source information defining which connections are needed to execute the shared query (and its various sub-queries associated with different data sources), relevant data source parameters, and the query specification defining the parameters and specifications of the shared query itself. In some instances, the query specification may include a list of particular objects, tables, views, or other items to be queried, along with particular query filters and prompt parameters, as needed). In some instances, script modifications to the shared query may be associated with the shared query as well.

To be able to consume the shared queries, in order to query the data sources they reference, the associated reporting and business intelligence tools need to be able to identify and/or obtain the shared query. Tools are provided via a central (or distributed) business intelligence system to allow clients to request the information, allowing the business intelligence system's functionality to identify the appropriate query specifications, data source connections, and other query-related information, as well as to execute the shared query and return the set of query results to the requesting tool. At consumption, the requesting tools do not need to upload the data sources or additional information regarding the data sources, as the business intelligence system performing the shared query maintains the information. The details of a particular shared query can be viewed via the tool if the appropriate access rights are met by the tool and its associated user.

The shared queries can be created, edited, shared, copied, deleted, or executed in any suitable business intelligence or reporting tool, as well as through web-based and client-side interfaces associated with the business intelligence system managing the shared queries. Additionally, shared queries can be defined using a first tool or system, and can be reused, edited, or otherwise modified by a second tool or system with the appropriate access rights to access and manipulate the shared query from the enterprise repository. The access rights can be defined on a shared query level, an enterprise repository level, or even, in some cases, a data source level, to ensure that only persons and systems with the appropriate authorization and rights access particular sets of data and queries.

FIG. 1 is a block diagram illustrating an example distributed computing system or environment 100 for creating and using shared queries based on heterogeneous data sources. Specifically, the illustrated system 100 includes, or is communicably coupled with, a business intelligence system 102, an information design system 159, and at least one client 180. For example, a user interacting with user interfaces presented on the client 180 may interact with the shared query manager 111 at the business intelligence system 102 to access and execute a particular shared query 141. Additionally, users associated with the information design system 159 may interact with the shared query manager 111 to define, edit and/or share one or more shared queries 141. A plurality of shared queries 141 may be stored at the business intelligence system 102, and can be accessed, executed, edited, and otherwise interacted with by the information design system 159 and at least one client 180, where the information design system 159 and client(s) 180 use the shared query manager 111 to perform those functions and ensure they are authorized for such manipulation and data source access. As illustrated, the inter-system interactions of FIG. 1 can be performed via network 150, which can also provide connections to the one or more data sources 153 associated with the shared queries 141.

The business intelligence system 102 is a server, computer, or plurality of servers or computers capable of performing functions associated with creation, modification, and execution of shared queries. The business intelligence system 102 may be part of an end-to-end enterprise resource planning (ERP) system or an analytics system, while in some instances, the business intelligence system 102 may be a dedicated system for managing shared queries. In some instances, the business intelligence system 102 may be a cloud-based system providing services to a plurality of systems.

In some implementations, the business intelligence system 102 may store, execute, or be associated with a plurality of shared queries 141, as well as a shared query manager 111 that manages various aspects of creation and use of shared queries. The shared query manager 111 manages various functions associated with shared queries 141, including managing both the design-time and run-time aspects of shared queries 141. In some implementations, the business intelligence system 102 may comprise or be associated with at least one Web server, where the shared query manager 111 represents or is associated with one or more Web-based applications or web services accessible by the client(s) 180 and the information design system 159 via network 150 or directly at the business intelligence system 102.

At a high level, the business intelligence system 102 comprises an electronic computing device operable to receive, transmit, process, store, or manage data and information associated with the environment 100. Specifically, the business intelligence system 102 illustrated in FIG. 1 is responsible for receiving application requests, for example, shared query creation or execution requests, from one or more information design applications 171 (of the information design system 159) or client applications 192 associated with the client(s) 180 of the environment 100 and, further, responding to the received requests by processing said requests in the shared query manager 111 and sending the appropriate responses to the requested applications. In addition to those requests, requests associated with the shared query manager 111 may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single system as encompassing the business intelligence system 102, environment 100 can be implemented using two or more servers or computers, as well as computers other than servers, including a server pool, to implement the business intelligence system 102. Indeed, the business intelligence system 102 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, illustrated business intelligence system 102 may be adapted to execute any operating system, including Linux, UNIX, Windows, Mac OS®, Java™, Android™, iOS™ or any other suitable operating system. According to one implementation, the business intelligence system 102 may also include or be communicably coupled with an e-mail server, a Web server, a caching server, a streaming data server, and/or other suitable server. Similar flexibility and variation may be associated with the other components illustrated in FIG. 1, including information design system 159 and clients 180, each of which may be comprised of different components, component types, and operating systems in different implementations.

The business intelligence system 102 also includes an interface 105, a processor 108, and a memory 132. The interface 105 is used by the business intelligence system 102 for communicating with other systems in a distributed environment—including within the environment 100—connected to the network 150, for example, the information design system client 159, the client(s) 180, and data sources 153, as well as other systems communicably coupled to the network 150 (not illustrated). Generally, the interface 105 comprises logic encoded in software and/or hardware in a suitable combination and operable to communicate with the network 150. More specifically, the interface 105 may comprise software supporting one or more communication protocols associated with communications such that the network 150 or interface's hardware is operable to communicate physical signals within and outside of the illustrated environment 100.

Generally, the business intelligence system 102 (and other components within environment 100) may be communicably coupled with a network 150 that facilitates wireless or wire-line communications between the components of the environment 100, as well as with any other local or remote computer, such as additional clients, servers, or other devices communicably coupled to network 150, including those not illustrated in FIG. 1. In the illustrated environment, the network 150 is depicted as a single network, but may be comprised of more than one network without departing from the scope of this disclosure, so long as at least a portion of the network 150 may facilitate communications between senders and recipients. In some instances, one or more of the components associated with the system may be included within the network 150 as one or more cloud-based services or operations.

The network 150 may be all or a portion of an enterprise or secured network, while in another instance, at least a portion of the network 150 may represent a connection to the Internet. In some instances, a portion of the network 150 may include a portion of a cellular or mobile data network or other network capable of relaying short message service (SMS) or multimedia messaging service (MMS) messages, as well as other suitable mobile data messaging. In some instances, a portion of the network 150 may be a virtual private network (VPN). Further, all or a portion of the network 150 can comprise either a wireline or wireless link. Example wireless links may include 802.11a/b/g/n, 802.20, WiMax, 3G, 4G (i.e., LTE), and/or any other appropriate wireless link. In other words, the network 150 encompasses any internal or external network, networks, sub-network, or combination thereof operable to facilitate communications between various computing components inside and outside the illustrated environment 100. The network 150 may communicate, for example, Internet Protocol (IP) packets, Frame Relay frames, Asynchronous Transfer Mode (ATM) cells, voice, video, data, and other suitable information between network addresses. The network 150 may also include one or more local area networks (LANs), radio access networks (RANs), metropolitan area networks (MANs), wide area networks (WANs), all or a portion of the Internet, and/or any other communication system or systems at one or more locations.

As also illustrated in FIG. 1, the business intelligence system 102 includes a processor 108. Although illustrated as a single processor 108 in FIG. 1, two or more processors may be used according to particular needs, desires, or particular implementations of the environment 100. Each processor 108 may be a central processing unit (CPU), a blade, an application specific integrated circuit (ASIC), a field-programmable gate array (FPGA), or another suitable component. Generally, the processor 108 executes instructions and manipulates data to perform the operations of the business intelligence system 102. Specifically, the processor 108 executes the functionality required to receive and respond to requests from the information design system 159 and the client(s) 180, as well as to perform the operations associated with the shared query manager 111 and the business intelligence system 102 as a whole, and those components' related modules and functionality, including communicating and working with the one or more data sources 153.

Regardless of the particular implementation, "software" may include computer-readable instructions, firmware, wired and/or programmed hardware, or any combination thereof on a tangible medium (transitory or non-transitory, as appropriate) operable, when executed, to perform at least the processes and operations described herein. Indeed, each software component may be fully or partially written or described in any appropriate computer language including C, C++, Java™, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The business intelligence system 102 is illustrated as including the shared query manager 111, itself including several additional applications, modules, and other software to be executed by the processor 108. The shared query manager 111, as well as its components, can be any application, program, or other software for managing and performing operations associated with shared queries 141. The shared query manager 111 represents any suitable software, or combination of software, that manages shared query-related functions at both run- and design-time. To perform these operations, the shared query manager 111 is illustrated as including several components, including: a connection manager 114, a query definition engine 117, a reporting engine 120, and query execution engine 123, and a user interface (UI) engine 129. These components, as well as any other or alternative components, assist the shared query manager 111 in creating, modifying, and executing shared queries.

At design time, the connection manager 114 and query definition engine 117, as well as suitable functionality of the shared query manager 111 as a whole, can be used to create or edit a particular shared query 141. The UI engine 129 of the shared query manager 111 can also be used to provide appropriate user interface screens and elements for defining and modifying the shared queries 141. In some implementations, no UI engine 129 may be included in or used by the shared query manager 111 itself, the shared query manager 111 instead using, for example, the GUI 174 of the information design system 159 to directly access the query definition engine 117. The connection manager 114 can be used to identify one or more data sources available to be associated with and used in a shared query 141. In some instances, the connection manager 114 can identify previously defined universes, OLAP databases, other relational or multi-dimensional databases, or specific files and documents to be associated with the shared query 141. Universes, such as those stored in universes memory storage 135, may be defined semantic layers residing between a database and the end user which acts as a business representation of a data warehouse or transaction database. Universes stored in universes memory storage 135 allow users (or here, the shared query manager 111) to interact with data without requiring detailed and technical understanding and knowledge of the particular data source. The universes stored in universes memory storage 135 may include a connection parameter to a single data structure, SQL structures (or objects) that map to actual SQL structures in the databases, and a schema of the tables and joins from the database. The objects created for the universe 135 should be relevant to the user's business environment to provide a business-focused entry to the database structures. The universes 135 may be created by database or technical experts, or they may be created automatically by suitable systems after particular aspects of interest are defined by users.

In one implementation, the shared queries 141 may be defined based on the semantic layer query model, as well as any other suitable models or technologies. Shared queries generally allow consumers to query collections of database data over an XML specification model—a query specification—with results being returned back in formats such as ROWSET or Multi-Dimensional (MD) datasets, providing the ability to order, filter, and group data, as needed or requested. The query specification uses an XML-based language to specify queries on databases over the semantic layer. This query specification can allow designers to select objects or columns desired to be queried and presented by the query in the final report or analysis view, to filter data to focus the analysis, and to sort and rank data to organize the information to display in the report.

Figure 5A:
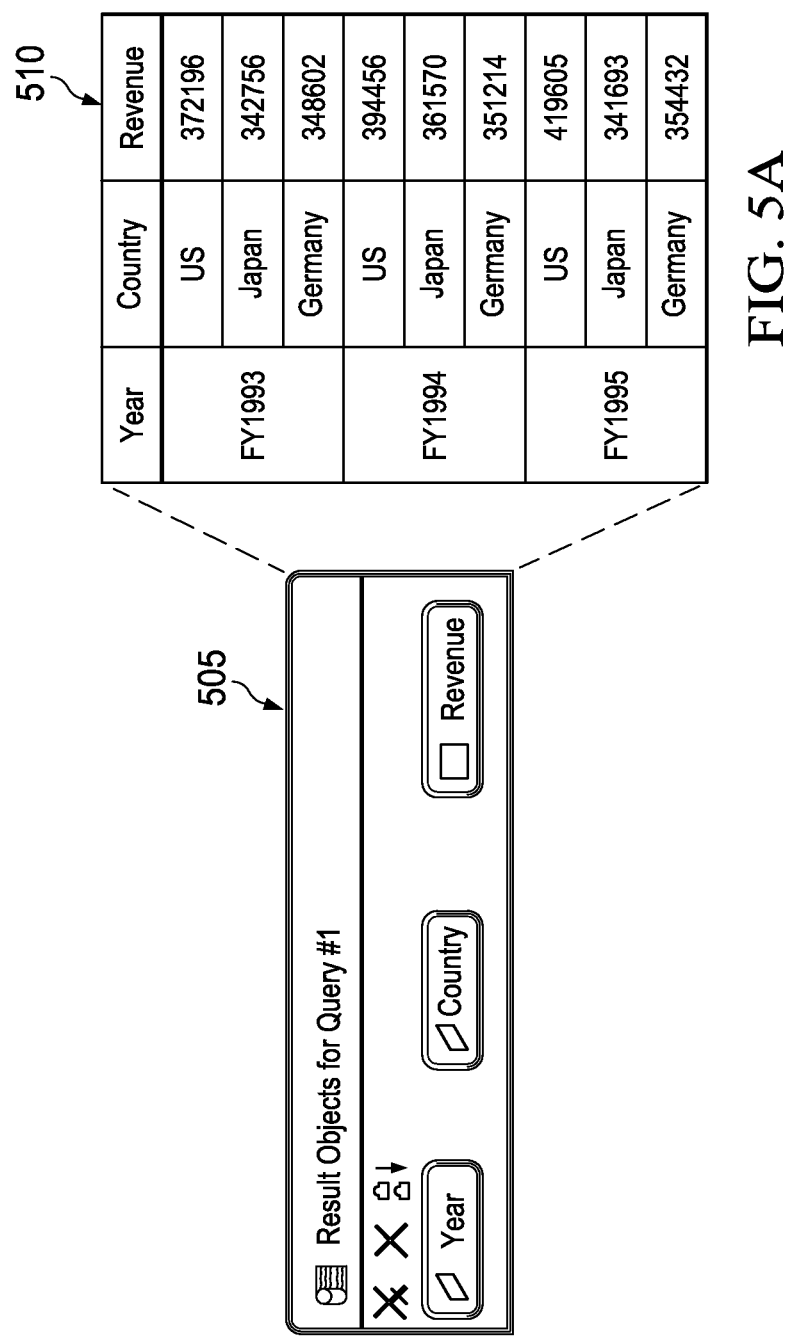
FIGS. 5A-B illustrate example search results associated with the execution and modification of an example shared query.

FIG. 5A illustrates an example of shared query 141. The example shows the objects 505 the query contains and an example result set 510 in response to executing the particular shared query 141. In the illustrated shared query 141, the Revenue by Year and by Country are to be presented. To do so, the user or designer of the shared query 141 selects the objects "Year," "Country," and "Revenue" from the underlying query specification. When the query is executed, the results 510 of the query, including the columns "Year," "Country," and "Revenue," are presented. The shared query manager 111 can provide tools to allow users and designers to significantly customize a particular query. For example, if an object used in a query specification object includes a hierarchy of information, explicit portions of that hierarchy may be specified to be returned, as opposed to the entire result set.

Figure 5B:
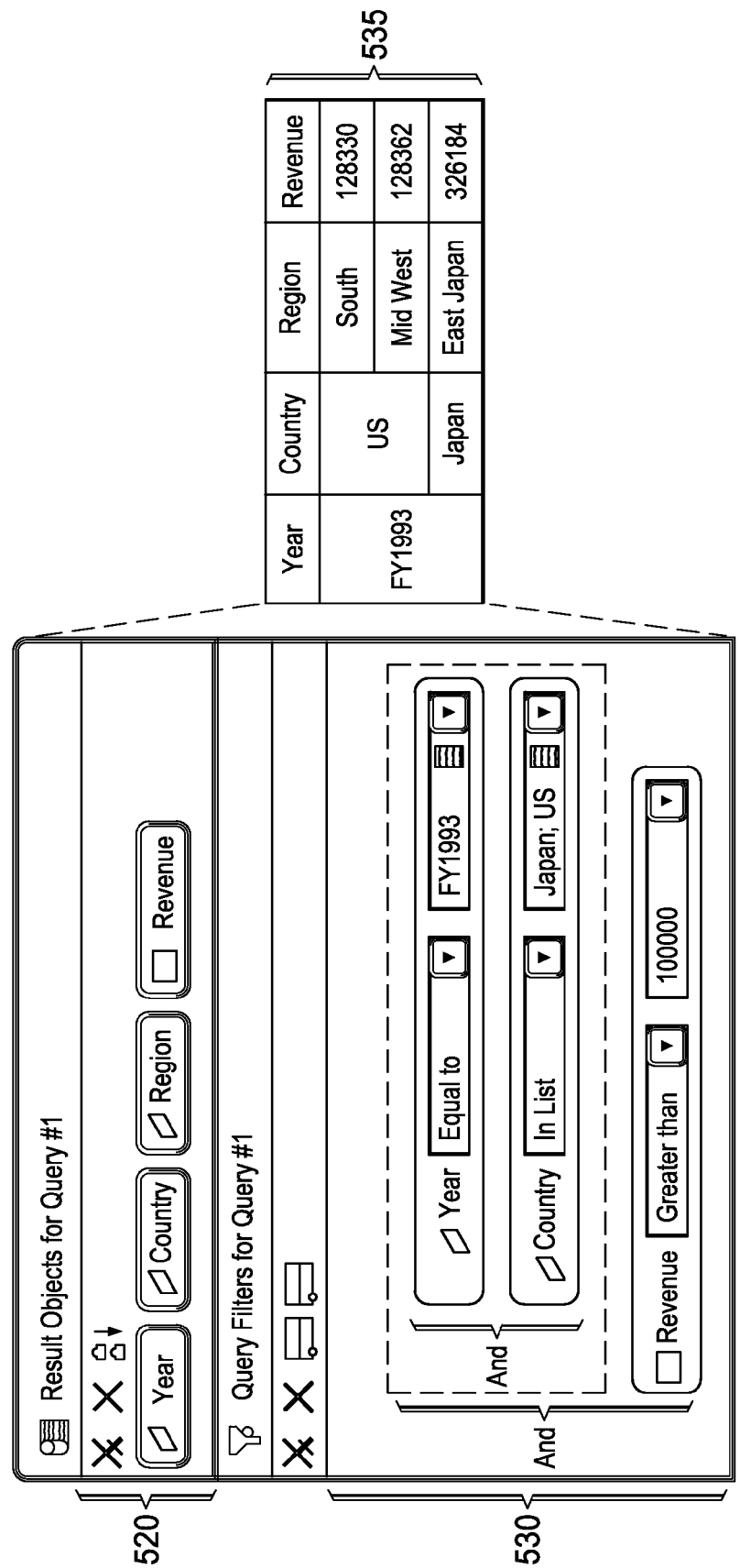

Similarly, query filters may be used to limit or restrict query result data presented by the shared query 141. Query filters can be added in using pre-defined filters defined at the level of the data source model or by defining custom query filters from the query model. Regarding the custom query filters, the shared query manager's query model allows creating query filters using comparison and logical operators such as Equal To (=), Not Equal To (⇔), Less Than (<), Greater Than (>), Less Than or Equal To (<=), Greater Than or Equal to (>=), Is [Not] Null, [Not] In List, [Not] Between, and [Not] Like. This query filter model can be the same for the relational and OLAP data sources. The shared query 141 allows for a query user or designer to combine several query filters using logical operators such as the conjunction operator "AND" and the disjunction operator "OR." For example, in the illustration of FIG. 5B, the query user or designer wants to display the Revenue by Year and by Country. For this purpose, the user or designer selects the objects "Year," "Country," and "Revenue" for the shared query 141 from the associated query specification, and then runs the shared query 141 in order to get the results. FIG. 5B also illustrates an example where the user or designer wants to display the Revenue greater than $100,000 by Country and by Region for the Fiscal Year in 1993 in Japan and the US. In order to specify this limitation, the user or designer creates query filters from the objects "Country," "Year," and "Revenue," providing a further filter upon the shared query 141. Based on these definitions, the shared query 141 may be modified for all users, but in some instances, the shared query 141 will remain as previously defined, with the modifications shown in FIGS. 5A and 5B representing changes made for a specific instance of the shared query 141 by the particular user or designer defining the particular aspects of this version of the shared query 141.

In some instances, dynamic filters can be created for shared queries 141 that require end-user prompts to be provided at runtime to execute the query, such as by defining particular attributes or filter criteria that the end-user requests at the time of execution. In some instances, the dynamic filters may ask for optional prompts, such that without additional input, the shared query 141 may execute as normal, but if additional input is received, then the shared query 141 may use that filter to revise the results requested.

In other instances, shared queries 141 can be defined to perform advanced complex query filters; automatically sort the returned query results; combine query results using unions, intersections, minuses (where data in a first query result is compared with a data in a second query result, and only the non-overlapping data from the first query result is returned); and joins, among others. Additional options and properties associated with the shared query 141 may be further defined via the shared query manager 111.

Returning to FIG. 1, the shared query manager 111 further includes the reporting engine 120 and the query execution engine 123. In some instances, the reporting engine 120 can be generally used by one or more reporting tools to request execution of a particular shared query 141 and through which to receive the corresponding result set. The reporting engine 120 may be associated with one or more APIs to make the functionality of the shared query manager 111 available to one or more reporting tools and client applications 192. In some instances, the reporting engine 120 may be available to and compatible with a plurality of reporting tools and external applications to allow flexibility in which programs have access to the shared queries 141. In some instances, one or more reports 144 may be stored at memory 132, allowing different consuming programs to view and access information in a consistent manner. In some instances, the reports 144 may be a view of or specific output format associated with a particular shared query 141.

The query execution engine 123 performs the operations and functionality needed to identify a shared query 141 to execute, determine the query specification associated with the identified shared query 141, and to identify and access the particular data sources 153 through one or more defined universes 135 and/or connections 138. The query execution engine 123 can create, activate, or use the appropriate connections to execute the shared query 141 as defined. In some instances, the query execution engine 123, or any other suitable component or function of the shared query manager 111, may compare the requesting application and/or associated user's access rights to a set of access rights 147 (shown in memory 132). The access rights 147 can define who and/or which applications are authorized to use, edit, or create particular shared queries 141, as well as who and/or which applications are authorized to use particular data sources 153, connections 138, universes 135 and/or reports 144. By providing the security mechanism at a centralized location such as the shared query manager 111, the system provides a simplified security solution that can protect from unauthorized use at both the shared query-level as well as the data source-level.

As illustrated, the query execution engine 123 includes a runtime native query definition engine 126. The runtime native query definition engine 126 is used to generate, at runtime, the data source-specific query needed to request and/or retrieve the information associated with the query. As multiple heterogeneous data sources may be associated with a single shared query 141, the methods of accessing those data sources may differ. The runtime native query definition engine 126 can interpret the shared query 141 and its query specification to identify the appropriate format for each data source, and can generate the query language necessary to retrieve data from the corresponding data source. Once the information is retrieved, the query execution engine 123 can combine the information from the multiple data sources into a combined query result set. In some instances, the combined query result set can be formatted into a unified format such that the information is presented similarly, without a clear demarcation as to from which data source particular information has been retrieved.

Memory 132 of the business intelligence system 102 may be a single or multiple memories. The memory 132 may include any type of memory or database module and may take the form of volatile and/or non-volatile memory including, without limitation, magnetic media, optical media, random access memory (RAM), read-only memory (ROM), removable media, or any other suitable local or remote memory component. The memory 132 may store various objects or data, including caches, classes, frameworks, applications, backup data, business objects, jobs, web pages, web page templates, database tables, repositories storing business and/or dynamic information, business object universes, database and data source connection-related information, product information, customer information, and any other appropriate information including any parameters, variables, algorithms, instructions, rules, constraints, or references thereto associated with the purposes of the business intelligence system 102. Additionally, the memory 132 may include any other appropriate data, such as VPN applications, firmware logs and policies, firewall policies, a security or access log, print or other reporting files, as well as others. As illustrated in FIG. 1, memory 132 includes information associated with the universes 135 (described above), one or more connections 138, the set of defined shared queries 141, one or more stored reports 144, and the set of access rights 147 associated with the shared queries 141 and the various connections 138 and universes 135 associated with them. The connections 138 included in memory 132 include defined connections to one or more data sources, which can include data source access techniques, instructions, addresses, and other information used to access particular data sources 153 associated with a particular shared query 141. In some instances, the connections 138 can include connections to particular documents or files that are to be queried, as well as direct connections to multidimensional databases, including OLAP databases and any other suitable data sources.

The illustrated environment of FIG. 1 also includes the information design system 159. The information design system 159 may be a specific computer or system used to define, edit, and/or otherwise modify one or more shared queries 141. The system 159 may be accessible to specific users, designers, or administrators, or associated with particular systems. In other instances, the information design system 159 may be similar to or the same as a particular client 180 (described below). In general, the information design system 159 provides one or more systems used to interact with the design-time aspects of the shared query manager 141. In general, the information design system 159 may be any computing device operable to connect to or communicate with at least the business intelligence system 102 via the network 150 using a wireline or wireless connection. In general, the information design system 159 comprises an electronic computer device operable to receive, transmit, process, and store any appropriate data associated with the environment 100 of FIG. 1. In more specificity, the information design system 159 may be associated with a user or developer working with the shared query manager 111.

The illustrated information design system 159 includes an information design application 171. The information design application 171 is any type of application that allows the information design system 159 and its user(s) to define and edit particular shared queries 141. The UI engine 129 can provide particular query visualizations and applications for presentation via the information design application 171. In some instances, the information design application 171 can be and/or include a Web browser or another client-side application performing operations on behalf of or associated with the shared query manager 111. For example, the information design application 171 may be a dedicated client-side version of at least a portion of the shared query manager 111.

The illustrated information design system 159 further includes an interface 162, a processor 165, and a memory 168. The interface 162 is used by the information design system 159 for communicating with other systems in a distributed environment—including within the environment 100—connected to the network 150; for example, the business intelligence system 102, as well as other systems communicably coupled to the network 150 (not illustrated). Generally, the interface 162 comprises logic encoded in software and/or hardware in a suitable combination and operable to communicate with the network 150. More specifically, the interface 162 may comprise software supporting one or more communication protocols associated with communications such that the network 150 or interface's hardware is operable to communicate physical signals within and outside of the illustrated environment 100.

As illustrated in FIG. 1, the information design system 159 includes the processor 165. Although illustrated as a single processor 165 in FIG. 1, two or more processors may be used according to particular needs, desires, or particular implementations of the environment 100. Each processor 165 may be a central processing unit (CPU), an application specific integrated circuit (ASIC), a field-programmable gate array (FPGA), or another suitable component. Generally, the processor 165 executes instructions and manipulates data to perform the operations of the information design system 159. For example, the processor 165 executes the functionality of the information design system 159 required to send requests to the business intelligence system 102 and to receive and process responses from the same. The GUI 174 of the information design system 159 can interface with at least a portion of the environment 100 for any suitable purpose, including generating a visual representation of a Web browser, presenting a set of database table metadata and/or data, presenting a query builder tool associated with the shared query manager 111, or performing other suitable actions. In some instances, the GUI 174 may be used to view and navigate various applications and Web pages located both internally and externally to the illustrated system, including the shared query manager 111 at the business intelligence system 102.

The GUI 174 may provide a graphical user interface to the shared query manager 111 operable to, for example, allow the user of the information design system 159 to interface with at least a portion of the shared query manager 111 and its associated operations and functionality, as well as other applications. Generally, the GUI 174 provides the particular user with an efficient and user-friendly presentation of business data provided by or communicated within the system. The GUI 174 may comprise a plurality of customizable frames or views having interactive fields, pull-down lists, and buttons operated by the user. For example, the GUI 174 may provide interactive elements that allow a user to interact with a particular business intelligence system 102, as well as other components within and/or external to environment 100. The different portions of the system's functionality may be presented and accessible to the user through the GUI 174. In general, the GUI 174 is often configurable, supports a combination of tables and graphs (bar, line, pie, status dials, etc.), and is able to build real-time portals, where tabs are delineated by key characteristics (e.g., site or micro-site). Therefore, the GUI 174 contemplates any suitable graphical user interface, such as a combination of a generic web browser, intelligent engine, and command line interface (CLI) that processes information in the platform and efficiently presents the results to the user visually. In some instances, the information design application 171 may be associated with or a remotely executing portion of the shared query manager 111.

The illustrated information design system 159 also includes a memory 168, or multiple memories 168. The memory 168 may be similar to or different from memory 132, and may include any memory or database module and may take the form of volatile or non-volatile memory including, without limitation, magnetic media, optical media, random access memory (RAM), read-only memory (ROM), removable media, or any other suitable local or remote memory component. Local and/or temporary information relevant to the information design application 171 can be stored there.

There may be any number of information design systems 159 associated with, or external to, the environment 100. For example, while the illustrated environment 100 includes one information design system 159, alternative implementations of the environment 100 may include multiple information design systems 159 communicably coupled to the business intelligence system 102 and/or the network 150, or any other number suitable to the purposes of the environment 100. Additionally, there may also be one or more additional information design systems 159 external to the illustrated portion of environment 100 that are capable of interacting with the environment 100 via the network 150. Further, the term "information design system," "client," and "user" may be used interchangeably as appropriate without departing from the scope of this disclosure. Moreover, while the information design system 159 is described in terms of being used by a single user, this disclosure contemplates that many users may use one computer, or that one user may use multiple computers.

As noted above, client 180 may be similar to the information design system 159. In other instances, the client 180 may not be associated with an information design application 171 and capable of creating, editing, and otherwise modifying shared queries 141. Instead, the client 180 may be associated with a client application 192 capable of interacting with the shared query manager 111 to consume particular shared queries 141 without query creation and modification functionality. The illustrated components of the client 180 (i.e., the interface 183, processor 186, memory 189, GUI 195, and client application 192) may be similar to or different from the corresponding components described for the information design system 159 and/or the business intelligence system 102.

While FIG. 1 is described as containing or being associated with a plurality of elements, not all elements illustrated within environment 100 of FIG. 1 may be utilized in each alternative implementation of the present disclosure. For example, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes, in addition to those purposes described herein.

Figure 2:
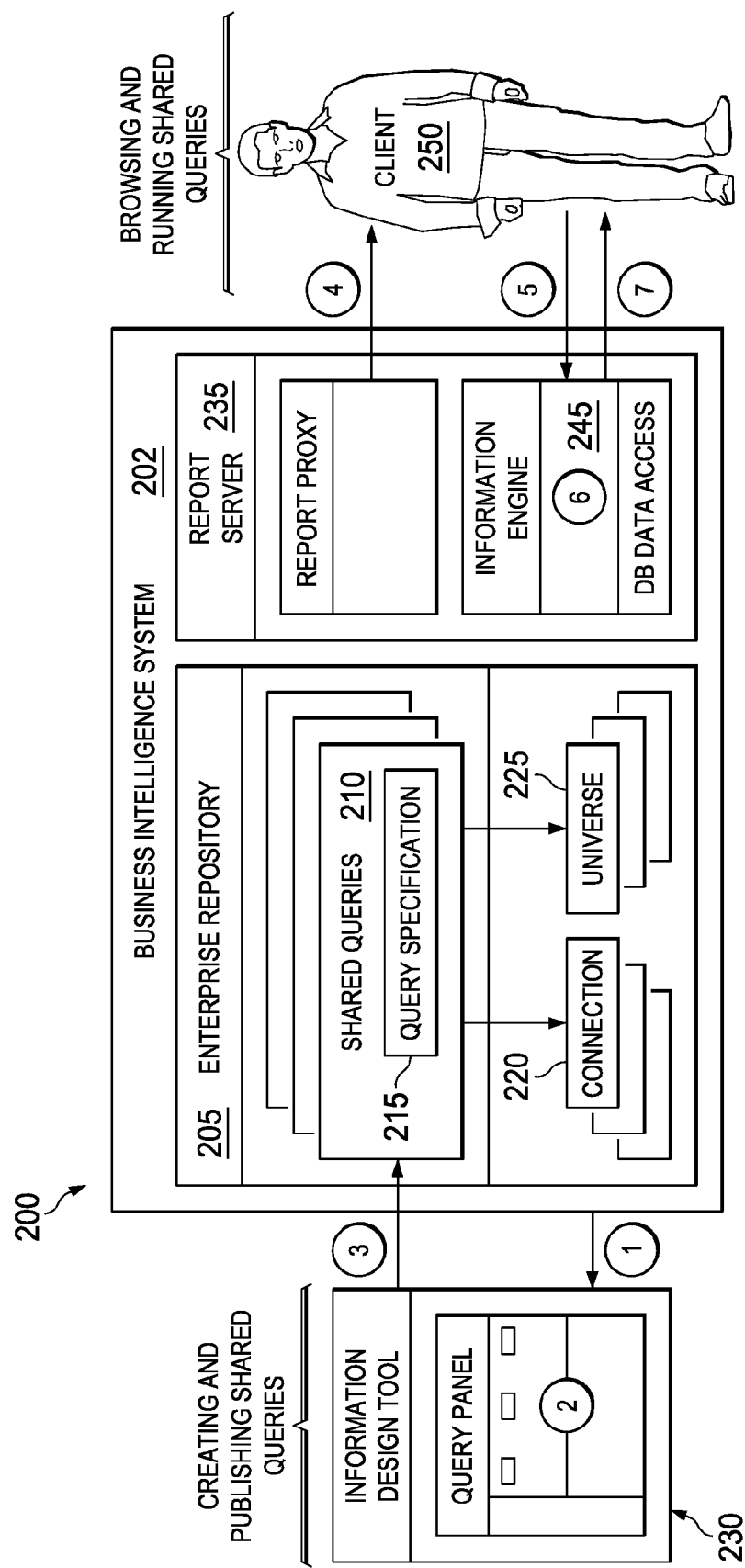
FIG. 2 is a diagram illustrating a plurality of example interactions between components and users in an example system for creating and using shared queries.

FIG. 2 is a diagram illustrating a plurality of example interactions between components and users in an example system 200 for creating and using shared queries. For purposes of description, FIG. 2 presents a detailed illustration of an implementation based in part on the example environment 100 described in FIG. 1, although any suitable system with one or more differences to environment 100 could be used or contemplated for use in FIG. 2. While FIG. 1 represents a generic framework, FIG. 2 can be used to illustrate an example implementation of a possible system. While some components may have different names, the components in FIG. 2 may be similar to those in FIG. 1, in some instances.

As illustrated, a business intelligence system 202 includes an enterprise repository 205, a report server 235, and an information engine 245. The business intelligence system 202, which may in some instances be similar to the business intelligence system 102 of FIG. 1, represents the overall system or systems in which shared queries are managed, created, and modified. Specifically, particular shared queries are stored in the enterprise repository 205. Different defined connections 220 and universes 225 may be associated with one or more shared queries 210, with each shared queries 210 defining at least one specific query specification 215 that can access the data sources associated with its corresponding connections 220 and universes 225. The query specification 215 contains, among other items, a list of the objects to query from the one or more associated databases.

The business intelligence system 202, which may be or may include a business object enterprise platform, or any other suitable business intelligence product or platform, includes a report server 235 that can be used for web intelligence-related searches, activities, and other reporting operations. The business intelligence system 202 also includes an information engine 245 responsible for executing particular shared queries 210, including by accessing the particular data sources associated with the shared query 210.

The information design tool 230 provides users and shared query designers or developers an application to create and modify shared queries 210, as well as to define particular universes 225 and connections 220. The information design tool 230 may be a web-based application, a client-side application, or an application accessible at the business intelligence system 202. Conversely, client 250 represents a user, tool, application, or other consumer of shared queries 210. The client 250 and users of the information design tool 230 may overlap in some instances, such that a client 250 may both design a shared query 210 using the information design tool 230 while also consuming one or more defined shared queries 210. In some instances, the client 250 may browse the enterprise repository 205 to view the set of available shared queries 210.

Using the information design tool 230, a shared query designer can browse currently available connections and universes with which to create a shared query 210 (as illustrated by (1)). In some instances, the shared query designer can identify and define one or more specific new universes 225 or connections 220 to be used in a shared query 210. In other instances, the shared query designer can select a pre-existing universe 225 or connection 220 to be used in a particular shared query 210, as well as a combination of universes 225 and/or connections 220. In this example, the connections 220 may include direct access to a particular file or document, as well as connections to a particular data source (e.g., an OLAP database).

Once a set of connections 220 and/or universes 225 is selected from the enterprise repository 205, the shared query designer can create the shared query 210 using the information design tool 230 (as illustrated by (2)). In some instances, the information design tool 230 may be associated with a query panel used to define the particular query specification, including the information to be accessed, any query filters to be used, and any other query-specific information, including how the information is to be combined (if necessary) and returned to consuming users or applications. In some instances, the shared query 210 may be defined using an application executing at the business intelligence system 202, while in others, the information design tool 230 may be located externally and/or remotely from the business intelligence system 202.

Once the shared query 210 is defined, the shared query designer can share it by publishing the shared query 210 to the enterprise repository 205 (as illustrated by (3)). The enterprise repository 205 and the shared queries 210 within may then be made accessible to any and/or all potential consumers, including various business intelligence tools and systems. In some implementations, at least some of the published shared queries 210 may be associated with a particular set of access rules defining which users and/or applications may execute or interact with particular shared queries 210. In those instances, the access rules may be defined at the time of publishing the shared query 210, as well as at any other suitable time, including before and after publishing.

Once the shared query 210 is published to the enterprise repository 205, it is available to all suitable and, in some instances, authorized business intelligence tools and users. At that time, those tools can select and execute the published shared queries 210 according to any defined access rights. Upon selection by a particular tool or user or client 250, the selected shared query 210 is transmitted to the information engine 245 for execution (as illustrated by (5)).

The information engine 245 then connects to the enterprise repository 205 to access the particular shared query's query specification and the information on the appropriate data sources (e.g., based on the connections 220 and universes 225 associated with the shared query 210) upon which the shared query 210 may be executed. The information engine 245 includes functionality for connecting to the appropriate data sources based on the defined parameters of the shared query 210. For each data source associated with the shared query 210, the information engine 245 generates a native query script to be executed on the corresponding data source. For example, if the data sources implicated by a particular shared query 210 include a relational database, an OLAP database, and a text file, the information engine 245 would generate a native query for each of those three data sources. As the native queries are generated, the information engine 245 executes the native queries against their respective data source (via the corresponding data source connection), and identifies the collective sets of query results. The query result sets are then combined (e.g., based on default behavior, user preferences or settings, defined presentation details or restrictions) into a combined query result set. The combined query result set can be formatted, as appropriate, and returned to the requesting client 250 (as illustrated by (7)). In some instances, the combined query result set can be formatted into a homogeneous result set, providing a consistent view of query results returned from a heterogeneous set of data sources.

FIG. 3 is a flow chart illustrating an example method 300 for executing a shared query. For clarity of presentation, the description that follows generally describes method 300 in the context of FIG. 1. However, it will be understood that method 300 may be performed, for example, by any other suitable system, environment, software, and hardware, or a combination of systems, environments, software, and hardware as appropriate.

At 305, a request to execute a shared query is received. The request to execute the shared query may be received from a particular reporting tool or user, in some instances. The requested shared query may be single shared query identified from a plurality of pre-defined shared queries available to one or more reporting tools and business intelligence systems at an enterprise repository. Some of the shared queries may be associated with particular access rights defining who and what may execute and/or otherwise interact with the shared query. Method 300 may include, in some instances, a determination of whether the requesting tool, user, or user associated with the requesting tool is allowed to access the particular shared query. If not, method 300 may end to avoid unauthorized use. If access is allowed, method 300 can continue.

At 310, a query specification associated with the requested shared query can be identified. The query specification can define the particular search terms, parameters, filters, and other specific aspects of the shared query to be used at runtime. Additionally, data sources associated with the shared query can be identified at 315. A shared query may be associated with one or more data sources, such that the shared query, when executed, requests information from a single or more locations. The data sources may include relational databases, business object universes, direct connections to particular files or documents, OLAP databases, a web service, or any other suitable data source. In some instances, a single data source may be associated with a particular shared query, where the single data source comprises a multi-source universe, capable of interacting with a plurality of data sources while the shared query only interacts with the multi-source universe itself.

At 320, native queries associated with each of the identified data sources are generated. If only one data source has been identified, only a single query may need to be generated. If the only data source is a multi-source universe, then the single query may be used to interact with a plurality of sources within the multi-source universe. The native queries may adapt the query specification associated with the shared query into a format corresponding to or compatible with the appropriate data source. As each shared query may be associated with multiple, heterogeneous data sources, a plurality of different native queries may be generated corresponding to each of the different data sources, with at least two or more of the native queries being in different formats. Further, in some instances, different information from particular data sources may be needed to complete the requirements of the shared query. In those instances, the native query may request only a portion of the overall data from the underlying query specification according to the information available from a particular data source.

At 325, the various native queries generated at 320 can be executed at their respective data sources. If only a single query is used for a single data source associated with the shared query, then the native query can be executed against that single data source. The executed native queries, where appropriate, can return multiple sets of query results, sometimes in different formats or providing only a portion of the overall results. At 330, those query results are collected, and at 335, the collected set of query results can be formatted into a unified, or common format. Additionally, should the various query results provide portions of information, the collected set of query results can be combined into their appropriate table or other suitable format to provide a comprehensible data set. For example, if a first native query searches for information on revenue from a first data source, while a second native query searches for information on a particular location where sales were made from a second source, the results from the first data source and second data source can be combined to provide a single table providing information on revenue by location. At 340, the formatted query results can be provided for presentation to the requesting reporting tool or other application. Additional and/or alternative operations may be used in the flow to perform method 300, as appropriate.

FIG. 4 is a flow chart illustrating an example method 400 for defining a shared query. For clarity of presentation, the description that follows generally describes method 400 in the context of FIG. 1. However, it will be understood that method 400 may be performed, for example, by any other suitable system, environment, software, and hardware, or a combination of systems, environments, software, and hardware as appropriate. Specifically, FIG. 4 and method 400 are described from the point of view of an information design application similar to the information design application 171 described in FIG. 1.

At 405, at least one data source can be identified to be associated with a new shared query. In some instances, only a single data source may be associated with a shared query, including a multi-source universe, which may act as a single data source to the shared query, but can provide convenient access to a plurality of sources via the operations of the universe itself. As described, the data source may be an existing connection, a universe (pre-existing or newly defined), or a connection (pre-existing or newly defined) to a particular database or other suitable data source. In some instances, two or more data sources may be identified, while in other instances, only one data source may be identified.

At 410, a query specification defining the shared query to be performed is received and associated with the shared query. The query specification can be provided in any suitable format. In some instances, the query specification may be written in a SQL-based language, while in others, a query panel graphical editor may be used to assist non-technical users in defining the particular elements of the shared query. Particular parameters, limitations, and other query characteristics can be defined and associated with the shared query, as appropriate. In some instances, a first user may initially define the query specification, while a second user may later modify and/or customize the shared query.

In some instances, a shared query may be associated with a set of access rights at 415. The access rights may be identified by explicit definition by the shared query designer, by default rules, or by other suitable access right assignment. Additionally, access rights may be automatically defined based on access rights associated with a particular data source. In some instances, while a particular data source may have access rights, those access rights may not be inherited by the shared query. Instead, a runtime determination of particular access rights to the data source may be performed. Further, access rights may limit access from a particular user, set of users, user roles, reporting tools, or other suitable limitations. In some instances, the access rights may be defined after the shared query has been published or otherwise created.

At 420, the shared query is published to and/or stored in an enterprise repository in which shared queries are maintained. The published shared query can be associated with the defined access rights, by reference or by embedded inclusion of the access rights within the shared query definition. Once published, a plurality of reporting tools and business intelligence systems associated with the enterprise repository may view and access the shared query, subject to any defined access rights.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method executed by at least one processor, the method comprising:
   receiving, by a computer system, a request to execute a shared query, wherein the shared query comprises one of a plurality of pre-defined shared queries, and the shared query comprises a pre-defined query specification associated with the shared query, the query specification comprising pre-defined connections to a first and a second data sources associated with the shared query, the query specification specifying the shared query on a semantic layer and including search terms, parameters, filters, and aspects of the shared query to be used at runtime upon execution of the shared query, where each pre-defined shared query of the plurality of pre-defined shared queries is associated with a corresponding set of access rights, and wherein the request to execute the shared query represents a specific request to execute a particular shared query from the plurality of pre-defined shared queries from a particular application or user;
   in response to receiving the request, determining whether the particular application or user is allowed to access the shared query based on the set of access rights associated with the shared query;
   allowing execution of the shared query upon a determination that the particular application or user is allowed to access the shared query, wherein allowing execution of the share query includes:
      identifying the pre-defined query specification associated with the shared query;
      in response to the identifying the pre-defined query specification, identifying the first data source and the second data source based on the identified query specification;
      generating a native query for each respective data source of the identified first and second data sources based on the identified query specification;
      executing the generated native queries at the respective data sources to collect a set of query results from the respective data sources; and
      formatting the set of query results from the respective data sources into a unified set of query results; and
   rejecting the execution request upon a determination that the particular application or user is not allowed to access the shared query.

2. The method of claim 1, wherein the request to execute the shared query is received from a reporting tool.

3. The method of claim 1, wherein the at least one of the first data source or the second data source includes at least one business object universe.

4. The method of claim 1, wherein the at least one of the first data source and the second data source includes at least one of a text file, a web service, an extensible markup language (XML) file, and an excel file.

5. The method of claim 1, wherein the plurality of pre-defined shared queries are stored in an enterprise repository.

6. The method of claim 1, wherein generating the native query for each of the first and second data sources based on the identified query specification includes:
   generating a first native query associated with the first data source based on the identified query specification, the first native query corresponding to a first format associated with the first data source; and
   generating a second native query associated with the second data source based on the identified query specification, the second native query corresponding to a second format different than the first format, the second format associated with the second data source.

7. The method of claim 6, wherein executing the generated native queries at the respective data sources to collect a set of query results from the respective data sources includes:
executing the first generated native query at the first data source to collect a first set of query results; and
executing the second generated native query at the second data source to collect a second set of query results.

8. The method of claim 7, wherein formatting the set of query results from the respective data sources into a unified set of query results includes:
combining the first set of query results and the second set of query results into the unified set of query results;
generating a homogeneous set of search results based on the unified set of search results; and
providing the homogeneous set of search results for presentation in response to the request to execute the shared query.

9. The method of claim 1, wherein the shared query is originally created by a first application, and wherein the request to execute the shared query is received from a second application different from the first application.

10. A computer program product encoded on a tangible, non-transitory storage medium, the product comprising computer readable instructions for causing one or more processors to perform operations comprising:
receiving, by a computer system, a request to execute a shared query, wherein the shared query comprises one of a plurality of pre-defined shared queries, and the shared query comprises a pre-defined query specification associated with the shared query, the query specification comprising pre-defined connections to a first and a second data sources associated with the shared query, the query specification specifying the shared query on a semantic layer and including search terms, parameters, filters, and aspects of the shared query to be used at runtime upon execution of the shared query, where each pre-defined shared query of the plurality of pre-defined shared queries is associated with a corresponding set of access rights, and wherein the request to execute the shared query represents a specific request to execute a particular shared query from the plurality of pre-defined shared queries from a particular application or user;
in response to receiving the request, determining whether the particular application or user is allowed to access the shared query based on the set of access rights associated with the shared query;
allowing execution of the shared query upon a determination that the particular application or user is allowed to access the shared query, wherein allowing execution of the share query includes:
identifying the pre-defined query specification associated with the shared query;
in response to the identifying the pre-defined query specification, identifying the first data source and the second data source based on the identified query specification;
generating a native query for each respective data source of the identified first and second data sources based on the identified query specification;
executing the generated native queries at the respective data sources to collect a set of query results from the respective data sources; and
formatting the set of query results from the respective data sources into a unified set of query results; and rejecting the execution request upon a determination that the particular application or user is not allowed to access the shared query.

11. The computer program product of claim 10, wherein the at least one of the first data source and the second data source includes at least one business object universe and at least one of a text file, a web service, an extensible markup language (XML) file, and a spreadsheet file.

12. The computer program product of claim 10, wherein the plurality of pre-defined shared queries are stored in an enterprise repository.

13. The computer program product of claim 10, wherein generating the native query for each of the first and second data sources based on the identified query specification includes:
generating a first native query associated with the first data source based on the identified query specification, the first native query corresponding to a first format associated with the first data source; and
generating a second native query associated with the second data source based on the identified query specification, the second native query corresponding to a second format different than the first format, the second format associated with the second data source.

14. The computer program product of claim 13, wherein executing the generated native queries at the respective data sources to collect a set of query results from the respective data sources includes:
executing the first generated native query at the first data source to collect a first set of query results; and
executing the second generated native query at the second data source to collect a second set of query results.

15. The computer program product of claim 14, wherein formatting the set of query results from the respective data sources into a unified set of query results includes:
combining the first set of query results and the second set of query results into the unified set of query results;
generating a homogeneous set of search results based on the unified set of search results; and
providing the homogeneous set of search results for presentation in response to the request to execute the shared query.

16. A system, comprising:
one or more processors;
memory storing one or more programs for execution by the one or more processors, the one or more programs operable when executed to:
receive a request to execute a shared query, wherein the shared query comprises one of a plurality of pre-defined shared queries, and the shared query comprises a pre-defined query specification associated with the shared query, the query specification comprising pre-defined connections to a first and a second data sources associated with the shared query, the query specification specifying the shared query on a semantic layer and including search terms, parameters, filters, and aspects of the shared query to be used at runtime upon execution of the shared query, where each pre-defined query of the plurality of pre-defined shared queries is associated with a corresponding set of access rights, and wherein the request to execute the shared query represents a specific request to execute a particular shared query from the plurality of pre-defined shared queries from a particular application or user;
in response to receiving the request, determining whether the particular application or user is allowed to access the shared query based on the set of access rights associated with the shared query;

allow execution of the shared query upon a determination that the particular application or user is allowed to access the shared query, wherein allowing execution of the share query includes:

identify the pre-defined query specification associated with the shared query;

in response to the identifying the query specification, identify the first data source and the second data source based on the identified query specification;

generate a native query for each respective data source of the identified first and second data sources based on the identified query specification;

execute the generated native queries at the respective data sources to collect a set of query results from the respective data sources; and format the set of query results from the respective data sources into a unified set of query results; and reject the execution request upon a determination that the particular application or user is not allowed to access the shared query.

17. The system of claim 16, the system further comprising an enterprise repository storing the plurality of pre-defined shared queries.

* * * * *